Inventors
Joseph J. Wochner
Harry H. Washbond
By Charles L. Schwab
Attorney

3,185,511
C-FRAME FOR TRACTOR MOUNTED TOOL
Joseph J. Wochner and Harry H. Washbond, Springfield, Ill., assignors to Allis-Chalmers Manufacturing Company, Milwaukee, Wis.
Filed Dec. 14, 1961, Ser. No. 159,401
2 Claims. (Cl. 287—129)

This invention relates to a C-frame for tractor mounted tools and more particularly relates to a joint for connecting two parts of a C-frame together.

Heretofore, segmented or two part C-frames have been connected together by nuts and bolts or the like; however, the connections so formed have not been entirely satisfactory in that they tend to work loose in actual use. The C-frame for large tractor dozers may be too wide to be loaded flat on a railroad flat car and this necessitates the C-frame being constructed in two parts and connected by suitable releasable means so as to permit disassembly for shipment as required. Since disassembly and the assembly may occur in the field it is important to provide a simple fastening arrangement for the two parts of the C-frame in order that tools readily available in the field can be used to secure and release the fastening means. The fastening means should be easily releasable to avoid requiring pin pullers or the like. Also, the fastening means should be simple to manufacture to permit the economical manufacture thereof.

It is an object of this invention to provide an improved connection for a segmented or multisection C-frame.

It is a further object of this invention to provide an improved joint for two parts of a C-frame which effectively resists torsional and shear loads without loosening.

It is a further object of this invention to provide a joint for two parts of a C-frame which is simple in construction, easy to assemble and disassemble with conventional tools, and economical to manufacture.

It is a further object of this invention to provide a joint for a C-frame that utilizes a constrictable resilient bushing with oppositely tapering surfaces engaging complementary surfaces formed in the two parts of the C-frame.

It is a further object of this inpention to provide a connection between two parts of the C-frame utilizing a plurality of resilient bushings with oppositely tapering camming surfaces and a central bore which constricts to engage a fastening member extending therethrough, whereby the bushing and fastening member act as a single integral member in resisting shear loading.

These and other objects and advantages of this invention will be apparent when the following description is read in conjunction with the drawings in which.

Figures 1, 2, 3, 4:
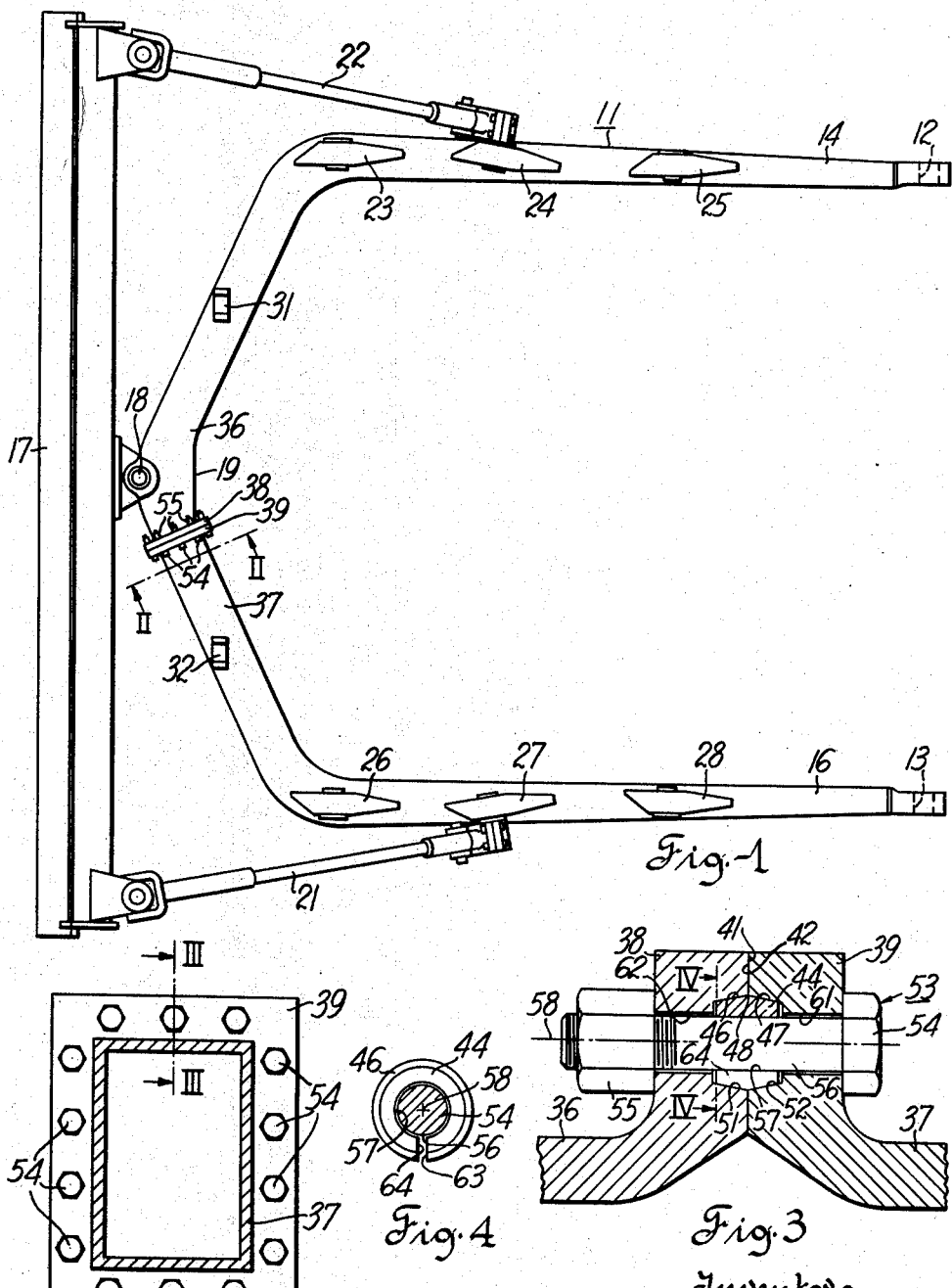
FIG. 1 is a top view of a dozer for a tractor vehicle wherein the present invention is incorporated.
FIG. 2 is a section view taken along the lines II—II in FIG. 1.
FIG. 3 is a section view taken along the lines III—III in FIG. 2.
FIG. 4 is a section view taken along the lines IV—IV in FIG. 3.

Referring to FIG. 1, a C-frame 11 for a tractor dozer has a pair of mounting bores 12, 13 at the ends of its legs 14, 16, respectively, which are adapted for connection to a tractor vehicle. A dozer blade 17 is pivotally connected by a pin 18 to the forward central portion 19 of the C-frame 11. Two pair of adjustable bracing struts 21, 22 are provided at opposite sides, respectively, of the dozer blade for connection with one of three associated attaching brackets 23, 24, 25 on leg 14 and one of three associated attaching brackets 26, 27, 28 on leg 16. Brackets 31, 32 are adapted for connection to lifting means carried by the tractor to which the dozer attachment is mounted. The C-frame although illustrated for mounting a dozer blade may be used to mount other tools or implements.

In certain instances it may be desirable or necessary to provide a two-piece C-frame and the present invention is concerned with an improved joint for connecting the two parts of such a segmented C-frame. The C-frame 11 illustrated in FIG. 1 has two parts 36, 37 which present flanges 38, 39 extending radially outwardly. The parts 36, 37 are substantially of box type sections as is illustrated in FIG. 2. The flanges 38, 39 have confronting flat faces 41, 42 which as illustrated in FIG. 3 are in engagement with one another.

Heretofore it was common practice to provide nuts and bolts for connecting two parts of a dozer C-frame. However, such connections were not entirely satisfactory in that they tended to work loose during use. In order to remedy the defects of the prior art constructions, the present invention provides a plurality of double tapered resilient bushings 44 having conically formed surfaces 46, 47 which taper in opposite axial directions away from a central portion 48 thereof to decreasing end diameters. Inwardly converging tapered surfaces 51, 52 are formed in the flanges 38, 39 to provide registering and complementary recesses for receiving the tapered bushings.

As illustrated in FIGS. 1 and 2 a plurality of tapered bushing and bolt connections 53 provide a highly effective fastening means for releasably securing the two parts of the dozer C-frame together. This fastening means is effective to withstand torsional and shear load to which the C-frame may be subjected without loosening up. Each bushing and nut and bolt connection 53 includes a bushing 44, a bolt 54 and a nut 55 in threaded engagement with the end of the bolt 54. Bolt 54 includes a cylindrical portion 56 which in the installed condition of the fastening means is grippingly engaged by the interior cylindrical surface 57 of the bushing 44 which defines a hole in coaxial relation to the surfaces 46, 47 thereof. The axis of the bolt and bushing is designated by reference character 58. In the noninstalled condition of the bushing as is illustrated in FIG. 4, the cylindrical portion 56 of the bolt 54 fits loosely in the opening defined by the cylindrical surface 57 of the bushing. However, when the bushing is installed, the bushing surfaces 46 and 47 by wedging action with complementary tapered surfaces 51, 52, will constrict the bushing to grip the bolt.

Thus in the installed condition the bushing and bolt are integral for purposes of resisting shear and torsional loading of the C-frame. Also the flanges 38, 39 and fastening means are so designed that when the nuts 55 are drawn up on the bolts 54 as illustrated in FIG. 3 the confronting faces 41, 42 will be in engagement. The bolt 54 may have a loose fit with the bores 61, 62 in the flanges 38, 39. Contraction or constriction of the bushing 44 is permitted by virtue of its being split. A pair of circumferentially confronting end surfaces 63, 64 on opposite circumferential ends of the bushing define a gap therebetween extending axially of the bushing.

Although a single embodiment of this invention has been illustrated and described, it is not intended to so limit the scope of the appended claims.

What is claimed is:
1. In a C-frame for a tractor mounted tool, the combination comprising:
 first and second parts of said C-frame terminating in outwardly and radially extending flanges presenting confronting flat faces, respectively,
 inwardly converging tapered surfaces on said flanges, respectively, forming a plurality of pairs of registering recesses in said flanges,
 a double tapered resilient bushing of hard material in each pair of registering recesses having
  conically formed surfaces of the same taper as said tapered surfaces tapering in opposite axial directions away from a central portion thereof to decreasing diameters,
a central opening in coaxial relation to said conically formed surfaces, and
circumferentially spaced and longitudinally extending end surfaces on said bushing in confronting relation to one another and defining a longitudinal gap permitting radial constriction of said bushing and
fastening means including a fastening member with a cylindrical portion extending through said opening, said fastening means urging said flanges toward one another thereby holding said conically formed surfaces of said bushing in full engagement with said tapered surfaces of said flanges and said bushing in gripping engagement with said cylindrical portion of said fastening member,
said bushing and fastening member preventing relative rotary movement and relative radial movement between said first and second parts.

2. The structure set forth in claim 1 wherein said flat faces of said flanges are held in engagement by said fastening means.

References Cited by the Examiner
UNITED STATES PATENTS

| | | | |
|---|---|---|---|
| 1,166,538 | 1/16 | Nesbit | 151—19 |
| 1,742,722 | 1/30 | Olsson et al. | 151—19 |
| 2,006,525 | 7/35 | Thal | 85—1 |
| 2,460,628 | 2/49 | Fawick | 287—85 |
| 2,679,735 | 6/54 | Rowe | 64—9 |
| 2,878,041 | 3/59 | Hobbs | 285—336 |
| 3,016,635 | 1/62 | Aston | 287—129 |

FOREIGN PATENTS

| | | |
|---|---|---|
| 715,566 | 12/31 | France. |
| 128,880 | 7/19 | Great Britain. |

CARL W. TOMLIN, *Primary Examiner.*
WALTER A. SCHEEL, *Examiner.*